United States Patent
Frieb-Preis et al.

(10) Patent No.: US 7,634,951 B2
(45) Date of Patent: Dec. 22, 2009

(54) SPINDLE DRIVE FOR A MOVABLE COMPONENT, THE SPINDLE DRIVE BEING DRIVABLE BY A DRIVE

(75) Inventors: Timo Frieb-Preis, Münstermaifeld (DE); Michael Kleinmann, Guellesheim (DE)

(73) Assignee: Stabilus GmbH, Koblenz (DE)

( * ) Notice: Subject to any disclaimer, the term of this patent is extended or adjusted under 35 U.S.C. 154(b) by 156 days.

(21) Appl. No.: 11/880,616

(22) Filed: Jul. 23, 2007

(65) Prior Publication Data

US 2008/0020893 A1 Jan. 24, 2008

(30) Foreign Application Priority Data

Jul. 22, 2006 (DE) .................. 10 2006 033 981

(51) Int. Cl.
*F16H 27/02* (2006.01)
(52) U.S. Cl. ............. 74/89.38; 74/89.35; 74/89.39
(58) Field of Classification Search ............ 74/89.35, 74/89.23, 89.32, 89.33, 89.34, 89.38, 89.39
See application file for complete search history.

(56) References Cited

U.S. PATENT DOCUMENTS

2005/0160846 A1* 7/2005 Chiang .................. 74/89.35
2007/0295126 A1* 12/2007 Wang .................... 74/89.35
2008/0028878 A1* 2/2008 Wang .................... 74/89.35

FOREIGN PATENT DOCUMENTS

DE 103 13 440 A1 10/2004

* cited by examiner

*Primary Examiner*—David M Fenstermacher
(74) *Attorney, Agent, or Firm*—Cohen Pontani Lieberman & Pavane LLP

(57) ABSTRACT

A spindle drive for a movable component includes a threaded spindle which is rotatable about a spindle axis; a spindle nut which engages the threaded spindle; and a transmission element which can be connected to the movable component, the transmission element being fixed against rotation about the spindle axis and being axially drivable by rotation of the spindle nut. An intermediate element, which is fixed against rotation relative to the spindle nut, extends axially with respect to the threaded spindle and is rotatable relative to the threaded spindle. A drive is connected to rotate one of the intermediate element and the threaded spindle; and the other of the intermediate element and the threaded spindle can be fixed against rotation.

18 Claims, 2 Drawing Sheets

SPINDLE DRIVE FOR A MOVABLE COMPONENT, THE SPINDLE DRIVE BEING DRIVABLE BY A DRIVE

BACKGROUND OF THE INVENTION

1. Field of the Invention

The invention relates to a spindle drive for a movable component, in particular for a component that can be swiveled about a swivel axis. The spindle drive is drivable by a drive and includes a threaded spindle which is rotatable about its spindle axis and on which there is disposed, in a non-self-locking manner, a spindle nut by which a transmission element that is connected to the component can be driven so as to be movable axially relative to the spindle axis. The transmission element, secured in respect of rotation about the spindle axis, is connected to the swiveling component.

2. Description of the Related Art

Known in the art, in the case of such a spindle drive for an automatically actuated vehicle door, is the practice of using an electric-motor drive for rotatably driving the threaded spindle via a gearing and a disconnectable clutch.

Manual application of force to the vehicle door can be detected by a sensor, and a corresponding signal can be supplied to electronic control means. The electronic control means then controls the clutch so as to decouple the drive from the threaded spindle, such that the vehicle door can be moved easily by hand.

In this case, driving of the spindle via a clutch requires a large amount of structural space. Moreover, the clutch is an elaborate and expensive component.

SUMMARY OF THE INVENTION

An object of the invention is to provide a spindle drive, of the type stated at the outset, which enables the movable component to be moved, both by the drive and with easy manual movement, and which requires a small structural space and is of a simple, inexpensive structure.

According to the invention, an intermediate element, which is secured in respect of the spindle nut against rotation about the spindle axis, is disposed so as to extend axially relative to the threaded spindle and so as to be rotatable relative to the threaded spindle. One of the intermediate element and the threaded spindle is rotatably drivable by the drive, and the other of the threaded spindle and the intermediate element is capable of being secured against rotation about the spindle axis.

This design makes it possible to dispense with a clutch that would require a substantial structural space and elaborate structure. Only an anti-rotation element is required, this being easily mounted and requiring only a small installation space.

The threaded spindle or the intermediate element can preferably be secured against rotation about the spindle axis by means of a disconnectable brake.

A compact construction is achieved where the intermediate element is a guide tube which surrounds the threaded spindle coaxially.

For the purpose of simple transmission of motion to the transmission element, the guide tube may have in its tube wall one or more longitudinal slots, extending axially, whose length corresponds at least to the length of the positioning travel of the spindle nut on the threaded spindle. Drivers of the spindle nut extend radially through the longitudinal slots, the drivers being able to act upon the transmission element axially relative to the spindle axis.

In this case, the driver or drivers can engage, at its/their free ends, in a ring groove of the transmission element, the ring groove being radially circumferential and open radially inwards. To increase the ease with which the component can be moved, the driver or drivers is/are preferably composed of a material which is of low friction as compared with the material of the transmission element, or it/they has/have a coating composed of a material which is of low friction as compared with the material of the transmission element.

It likewise serves to increase the ease of movement if the transmission element is mounted on a non-threaded portion of the threaded spindle so as to be capable of relative rotation via one or more bearings.

A further reduction of the structural space of the spindle drive is achieved where the transmission element is a transmission tube which surrounds the intermediate element coaxially relative to the spindle axis, and one end of which is connected to the swiveling component.

The spindle drive thereby assumes a telescopic structure.

The drive could be a drive which drives in only one direction of movement, a movement in the other direction of movement being effected manually.

It is particularly convenient, however, if the drive of the intermediate element or threaded spindle is a reversible drive, such that the movable component can be moved, optionally by the drive or manually, in both directions of movement.

The drive is preferably a motor drive, in particular an electric-motor drive.

A simple structural space with a small space requirement results if a groove-free region of the guide tube carries a toothed wheel in which there engages either a pinion that can be rotatably driven by the drive or a pinion disposed on a brake shaft that can be arrested by the brake.

A further reduction in the structural space required in the region of the spindle drive can be achieved by disposing the drive at a location remote from the spindle drive, and connecting the drive to the intermediate element or to the threaded spindle via transmission means, in particular a flexible shaft.

If the movable component is a swiveling component, the transmission element is coupled to the swiveling component in an articulated manner at a radial distance from the swivel axis. The movable component is preferably a door or a gate of a motor vehicle.

The brake may be actuated mechanically or else, also, electrically. Electrical actuation is possible by means of switches, or also in dependence on application of force to the movable component, such application being detected by a sensor.

The movable component may be a component which can be swiveled about a swivel axis, or else it may also be a component which can be moved linearly.

Moreover, the intermediate element or the threaded spindle may be rotatably drivable by the drive, via a gearing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
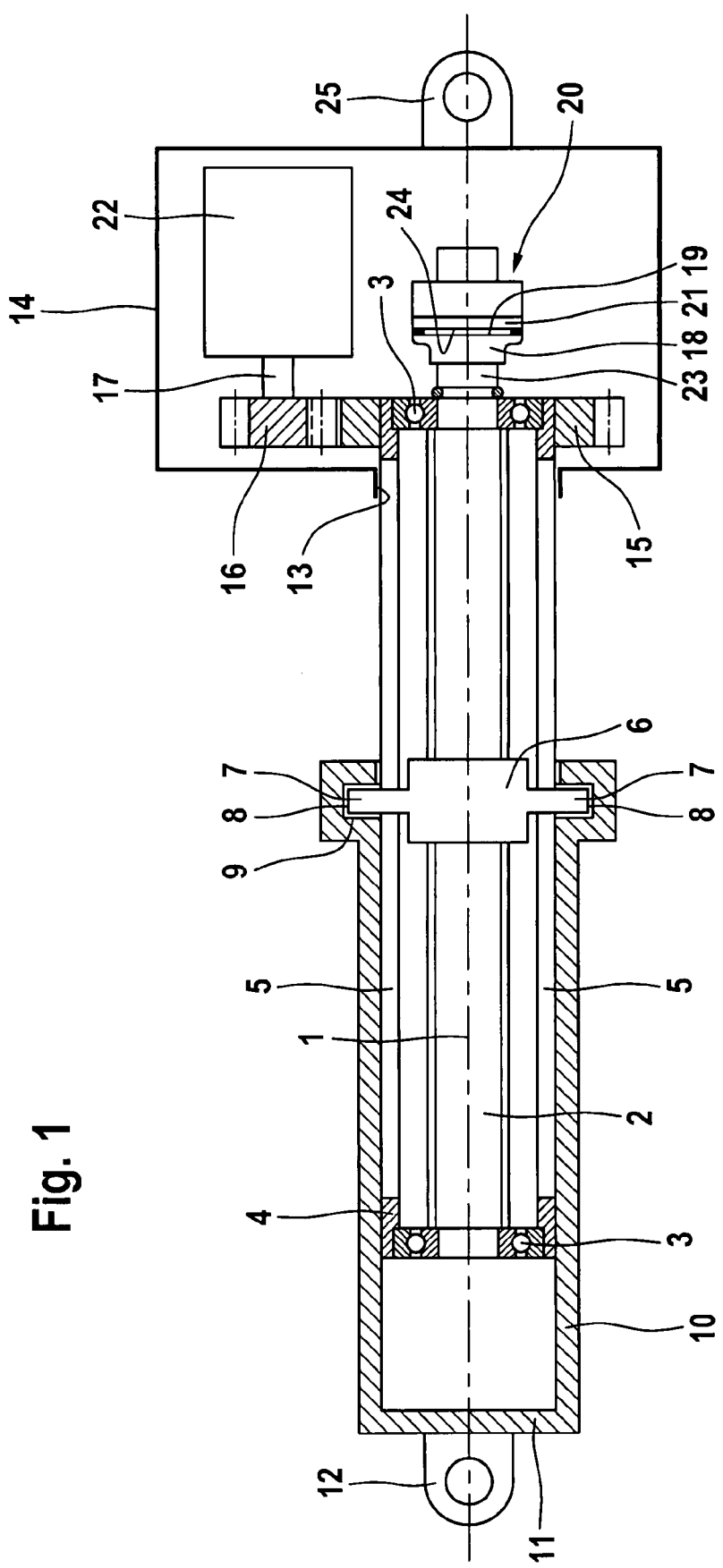
FIG. 1 shows a cross section of a first exemplary embodiment of a spindle drive.

The spindle drives represented have a threaded spindle 2, which is rotatable about a spindle axis 1 and on both ends of which there is respectively disposed an inner race of a rolling bearing 3. A guide tube 4, which surrounds the threaded spindle coaxially at a distance, is disposed on the outer races of the rolling bearings 3, such that the threaded spindle 2 and the guide tube 4 can rotate freely relative to one another.

Longitudinal slots 5 are realized diametrically opposite each other in the guide tube 4, these slots extending over the length of the positioning travel of a spindle nut 6 disposed in a non-self-locking manner on the thread of the threaded spindle 2.

The spindle nut 6 has two radial drivers 7, which project radially through the longitudinal slots 5 and whose free ends 8 project into a ring groove 9 of a transmission tube 10 which is guided so as to be axially displaceable on the outer circumferential surface of the guide tube 4. The radially circumferential ring groove 9, which is open radially inwards towards the guide tube 4 and is of approximately the same width as the axial width of the drivers 7, is realized at one end region of the transmission tube 10.

The transmission tube 10 projects beyond one end of the threaded spindle 2 and is closed by a base 11 at the end which projects beyond the threaded spindle 2. The base 11 carries an articulation eye 12, by means of which the transmission tube 10 can be coupled in an articulated manner to a component, not represented, whose position can be shifted by the spindle drive, the transmission tube 10 being secured against rotation about the spindle axis 1.

A ball socket could also be used instead of the articulation eye.

The component may be a gate that can be swiveled about a swivel axis, for example a tailgate of a motor vehicle.

The end region of the guide tube 4 that is opposite to the articulation eye 12 projects through a bearing aperture 13, in which the guide tube 4 is rotatably mounted, into a housing 14. A ring gear 15, in which a pinion 16 engages, is fixed to the end of the guide tube 4 that projects into the housing 14.

At its end which faces away from the threaded spindle 2, the housing 14 has a second articulation eye 25 or a ball socket, by means of which the housing 14 can be coupled in an articulated manner to a fixed component (not represented), the housing 14 being secured against rotation about the spindle axis 1.

In the case of the exemplary embodiment represented in FIG. 1, the pinion 16 is a drive pinion of an electric-motor drive 22 which is disposed in the housing 14, this drive pinion being seated on a drive shaft 17.

The end of the threaded spindle 2 that projects into the housing 14 carries a brake disk 18 having a coaxially oriented first brake-contact surface 19.

A second brake-contact surface 24, on a rotationally rigid brake disc 21 of a brake 20 disposed on the housing 14, is coaxially opposite the first brake-contact surface 19. The brake 20 can move the brake disc 21 axially between a braked position bearing on the brake disc 18 and a released position raised from the brake disc 18.

In the case of the brake disc 21 bearing on the brake disc 18, the threaded spindle 2 is secured against rotation about the spindle axis 1.

When the brake disc 21 is in the position raised from the brake disc 18, the threaded spindle 2 is rotatable about the spindle axis 1.

Figure 2:
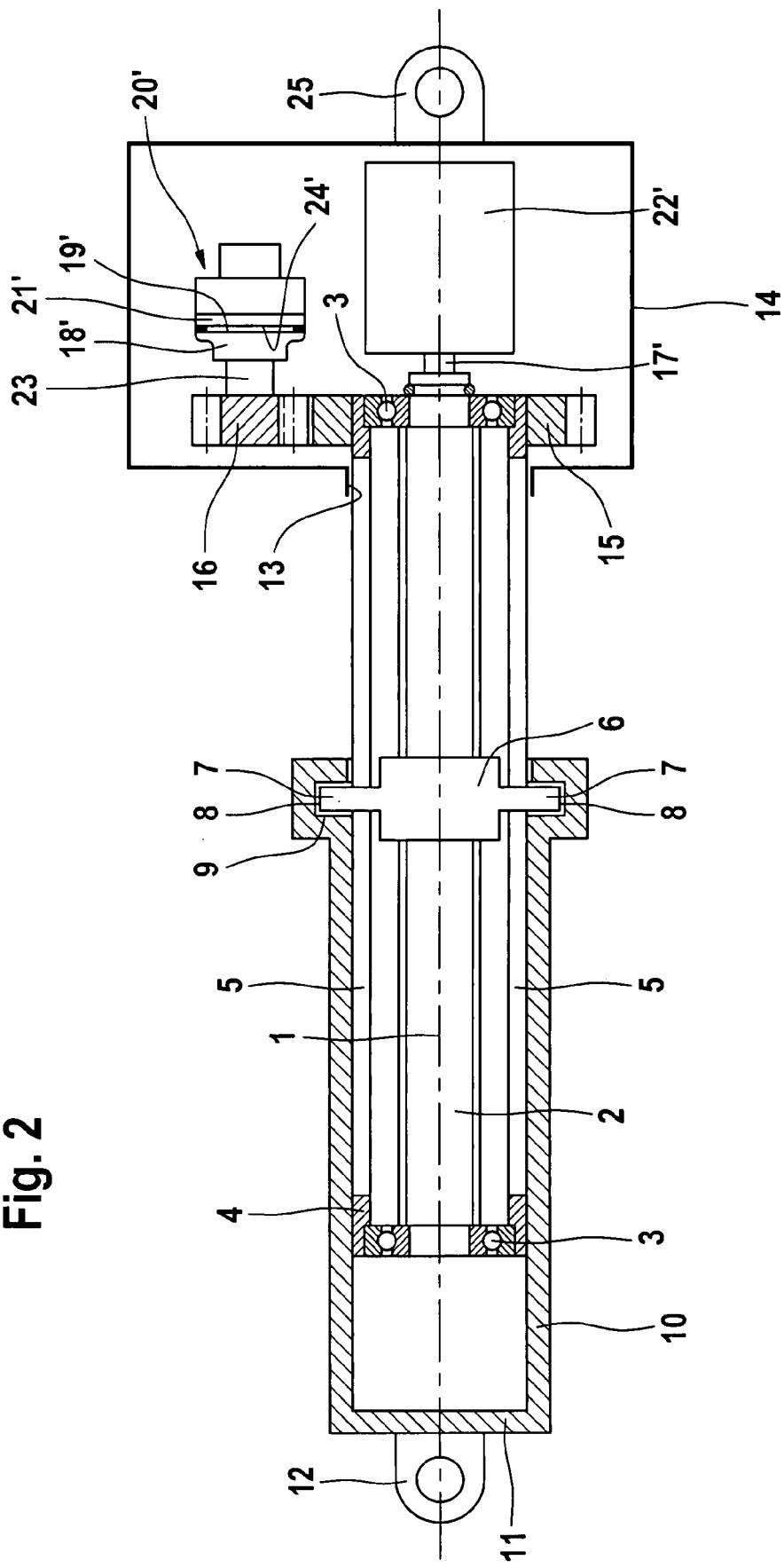
FIG. 2 shows a cross section of a second exemplary embodiment of a spindle drive.

In the case of the exemplary embodiment of FIG. 2, an electric-motor drive 22' is disposed in the housing 14, coaxially relative to the threaded spindle 2, the drive shaft 17' of this electric-motor drive being connected coaxially and in a rotationally rigid manner to the end of the threaded spindle 2 that projects into the housing 14.

The pinion 16 is disposed in a rotationally rigid manner on a brake shaft 23 which, at its end opposite to the pinion 16, has a coaxially oriented brake disc 18' having a first brake-contact surface 19'.

A second brake-contact surface 24, on a rotationally rigid brake disc 21 of a brake 20' disposed on the housing 14, is coaxially opposite the first brake-contact surface 19'. The functioning of the brake 20' corresponds to the functioning of the brake 20.

The functioning of the exemplary embodiment of FIG. 1 is as follows:

For the purpose of motor-actuated driving of the movable component, the brake 20 is closed and the threaded spindle 2 is held in a rotationally rigid manner.

If the guide tube 4 is rotatably driven by the electric-motor drive 22, the spindle nut 6 is rotated by means of the torque-positive and axially movable connection between the spindle nut 6 and the guide tube 4.

Since the brake 20 is closed, the spindle nut 6, and also the transmission tube 10 connected to the movable component, moves in the axial direction.

If the movable component is to be moved by manual application of force, the brake 20 is opened. The manual application of force to the movable component causes the transmission tube 10 to be moved axially. The threaded spindle 2 rotates as a result, being driven passively by the spindle nut 6 connected to the transmission tube 10. This requires a very small amount of torque, and hence also a very small amount of manual force.

The functioning of the exemplary embodiment of FIG. 2 is as follows:

For the purpose of motor-actuated driving, the brake 20' that is connected to the guide tube 4 in a torque-positive manner is closed, and the guide tube 4 is thereby also held in a rotationally rigid manner.

If the threaded spindle 2 is then driven by the electric-motor drive 22', a torque is also applied to the spindle nut 6. Since, however, the spindle nut 6 and the guide tube 4 are connected to each other in a torque-positive and axially displaceable manner, the spindle nut 6, and thereby also the transmission tube 10, is moved in the axial direction, and the movable component consequently moved.

If the movable component is to be moved by manual application of force, the brake 20' is opened.

The manual application of force to the movable component causes the transmission tube 10 to be moved axially. As a result, the guide tube 4 is rotatably driven on the threaded spindle 2, via the spindle nut 6.

Here, likewise, very little manual force is expended.

It is understood that, in principle, the electric-motor drive and the brake may also be disposed in series with each other.

Moreover, a mechanical spring or a gas spring may additionally be provided, to counterbalance the weight of the swiveling component.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A spindle drive for a movable component, the spindle drive comprising:
   a threaded spindle which is rotatable about a spindle axis;
   a spindle nut which engages the threaded spindle;
   a transmission element which can be connected to the movable component, the transmission element being fixed against rotation about the spindle axis and being axially drivable by rotation of the spindle nut;
   an intermediate element which is fixed against rotation relative to the spindle nut, the intermediate element extending axially with respect to the threaded spindle and being rotatable relative to the threaded spindle;
   a drive connected to rotate one of the intermediate element and the threaded spindle; and
   a brake for fixing the other of the intermediate element and the threaded spindle against rotation.

2. The spindle drive of claim 1 wherein the intermediate element is a guide tube which surrounds the threaded spindle coaxially.

3. The spindle drive of claim 2 wherein the guide tube has at least one axially extending longitudinal slot with a length corresponding to a desired axial movement of the nut relative to the threaded spindle, the spindle nut having at least one driver extending radially through a respective at least one of the longitudinal slots, the at least one driver acting on the transmission element to move it axially.

4. The spindle drive of claim 3 wherein the transmission element has a radially inward facing ring groove, each said at least one driver having a free end which engages in the annular groove.

5. The spindle drive of claim 3 wherein the transmission element comprises a material having a coefficient of friction, the at least one driver having a surface with a coefficient of friction which is lower than the coefficient of friction of the material.

6. The spindle drive of claim 2 wherein the threaded spindle has at least one non-threaded portion, the guide tube being mounted for rotation with respect to the threaded spindle by at least one bearing on a respective at least one non-threaded portion.

7. The spindle drive of claim 1 wherein the transmission element is a transmission tube which surrounds the intermediate element coaxially, the transmission tube having an end which can be connected to the movable element.

8. The spindle drive of claim 1 wherein the drive is reversible, whereby said one of said intermediate element and said threaded spindle can be rotated in opposite directions.

9. The spindle drive of claim 8 wherein the drive comprises an electric motor.

10. The spindle drive of claim 2 further comprising a ring gear fixed to the guide tube, the drive comprising a pinion which engages the ring gear.

11. The spindle drive of claim 2 further comprising a ring gear fixed to the guide tube, the brake comprising a pinion which engages the ring gear.

12. The spindle drive of claim 1 further comprising a flexible shaft between said drive and said one of said intermediate element and said threaded spindle.

13. The spindle drive of claim 1 wherein the movable component can be swiveled about a swivel axis, the movable component being connected to the transmission element at a radial distance from the swivel axis.

14. The spindle drive of claim 1 wherein the movable component is one of a gate and a door of a motor vehicle.

15. The spindle drive of claim 1 further comprising gearing between said drive and said one of said intermediate element and said threaded spindle.

16. The spindle drive of claim 1 wherein the brake comprises a first contact surface fixed to the other of the intermediate element and the threaded spindle, and a second contact surface which is fixed against rotation, whereby the other of the intermediate element and the threaded spindle can be fixed against rotation by engaging the first and second contact surfaces.

17. The spindle drive of claim 1 wherein the drive is connected to rotate the intermediate element, and the brake is arranged to fix the threaded spindle against rotation.

18. The spindle drive of claim 1 wherein the drive is connected to rotate the threaded spindle, and the brake is arranged to fix the intermediate element against rotation.

* * * * *